(No Model.)  5 Sheets—Sheet 1.
P. C. BLAISDELL.
WOOD BUNDLING MACHINE.
No. 580,816. Patented Apr. 13, 1897.
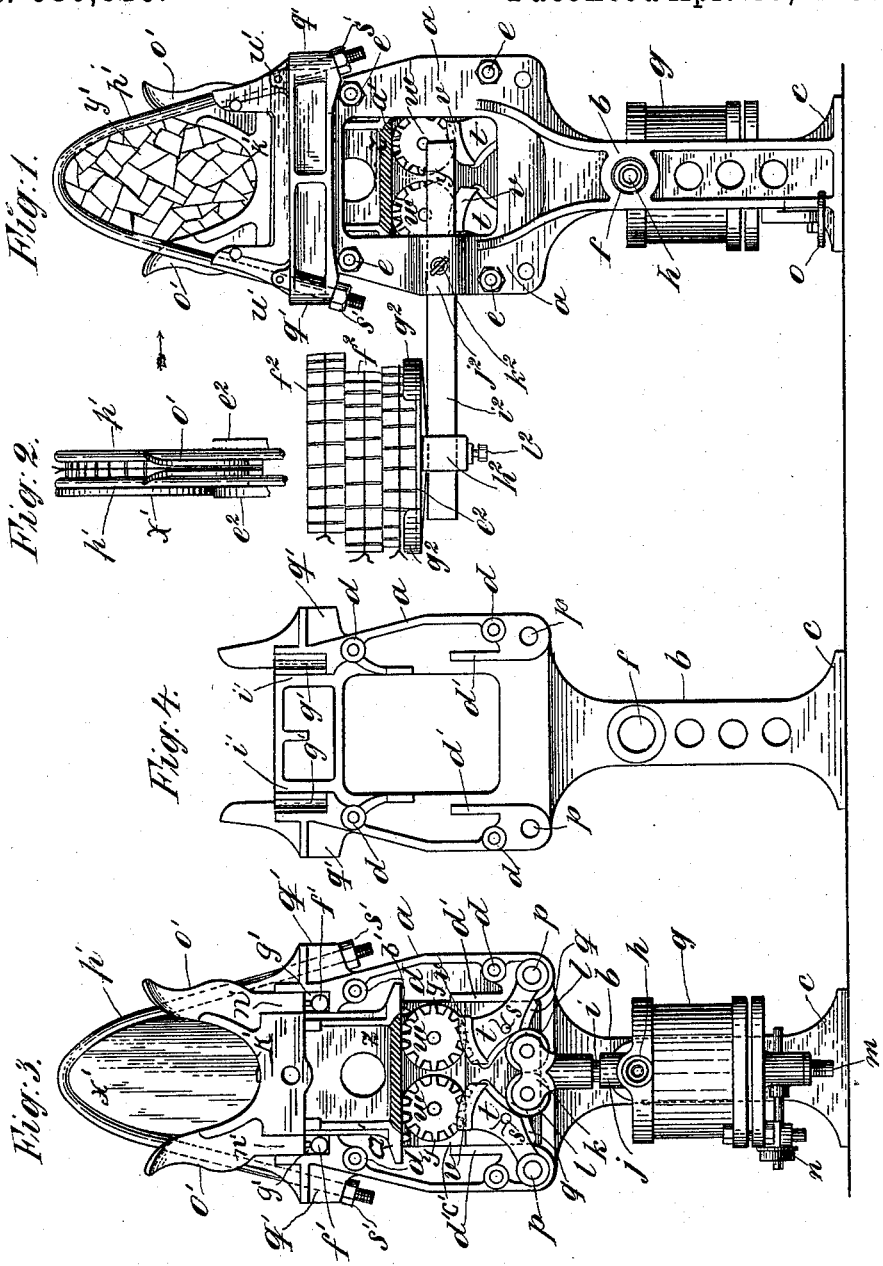
WITNESSES:
INVENTOR:
Phil. C. Blaisdell
By A. P. Thayer
Attorney.

(No Model.)  
P. C. BLAISDELL.  
WOOD BUNDLING MACHINE.  
No. 580,816. Patented Apr. 13, 1897.
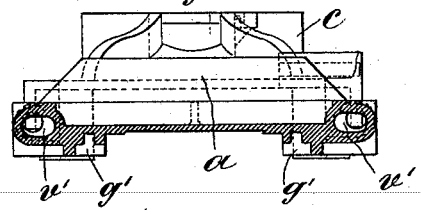
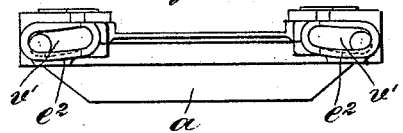
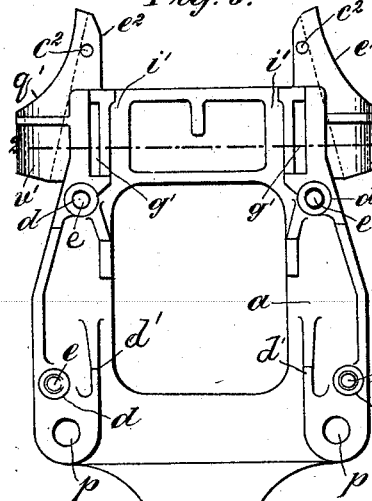
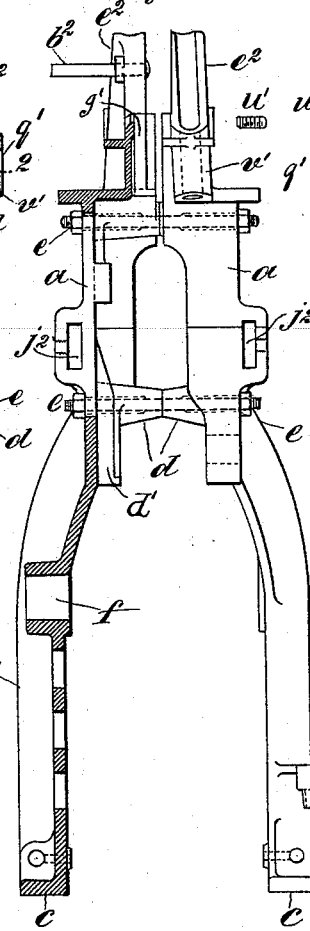
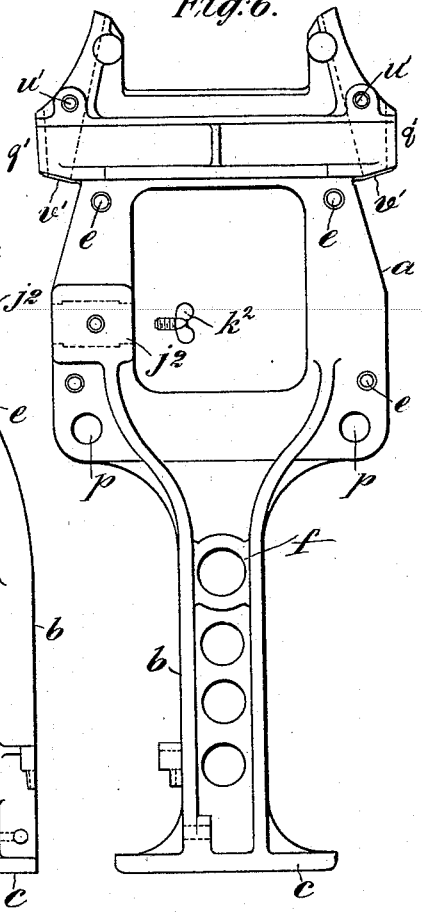
WITNESSES:
INVENTOR:
Philo C. Blaisdell
A. P. Thayer
By
Attorney.

(No Model.)  5 Sheets—Sheet 3.
P. C. BLAISDELL.
WOOD BUNDLING MACHINE.
No. 580,816.  Patented Apr. 13, 1897.
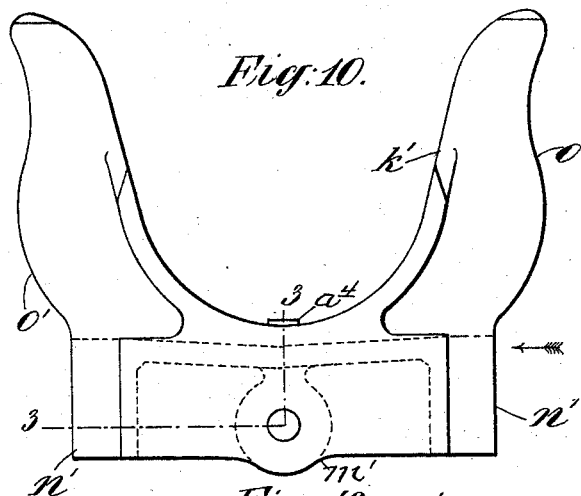
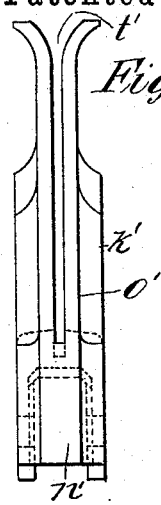
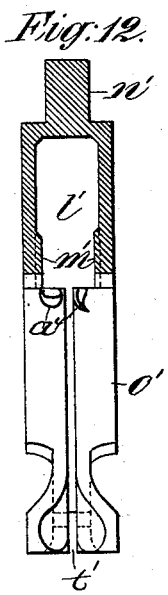
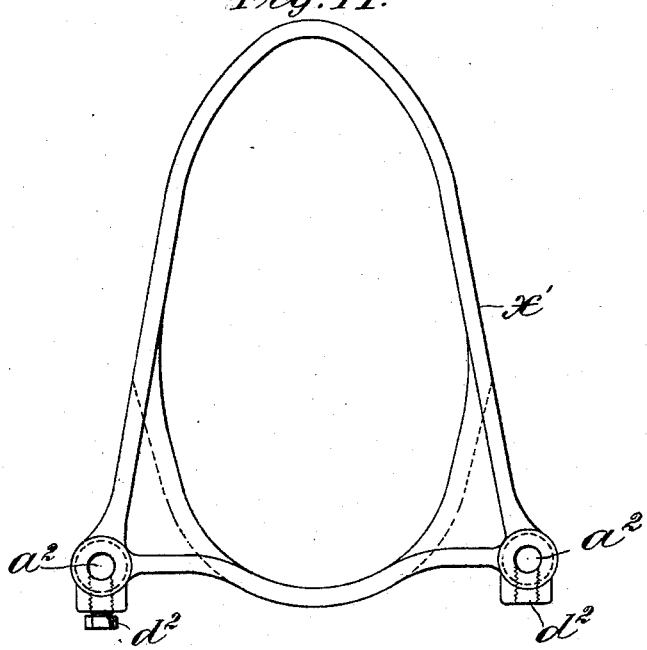
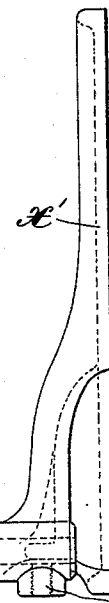
WITNESSES:
INVENTOR:
Philo C. Blaisdell
By A. P. Thayer
Attorney.

(No Model.)  5 Sheets—Sheet 4.
P. C. BLAISDELL.
WOOD BUNDLING MACHINE.
No. 580,816. Patented Apr. 13, 1897.
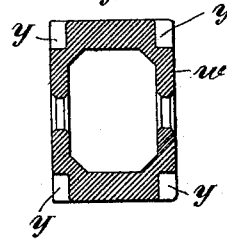
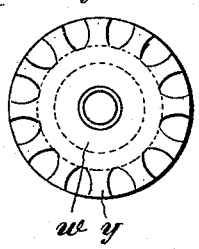
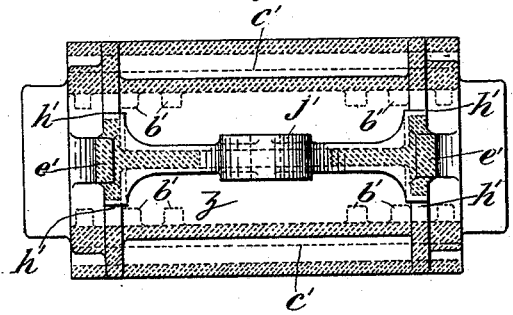
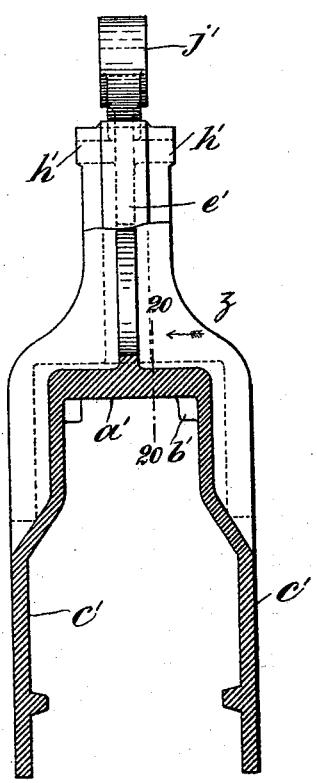
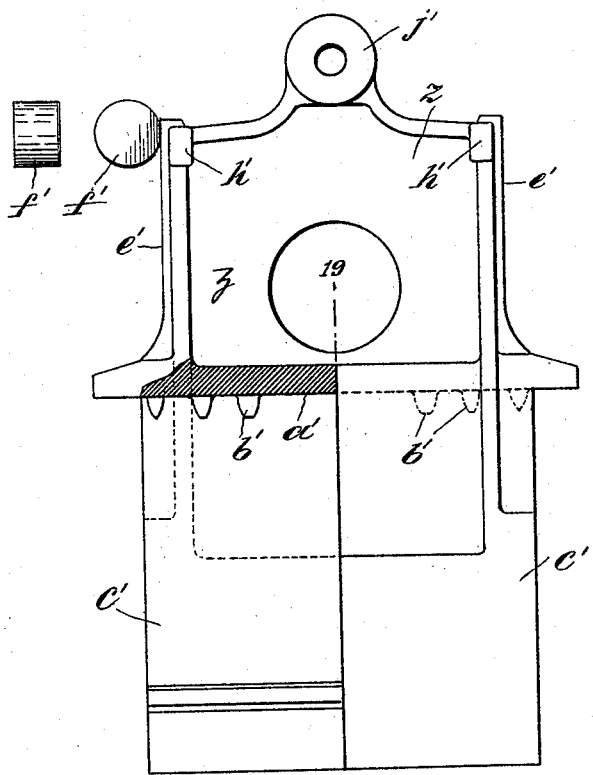
WITNESSES:
INVENTOR:
Philo C. Blaisdell
By A. P. Thayer
Attorney.

(No Model.)  5 Sheets—Sheet 5.
P. C. BLAISDELL.
WOOD BUNDLING MACHINE.
No. 580,816.  Patented Apr. 13, 1897.
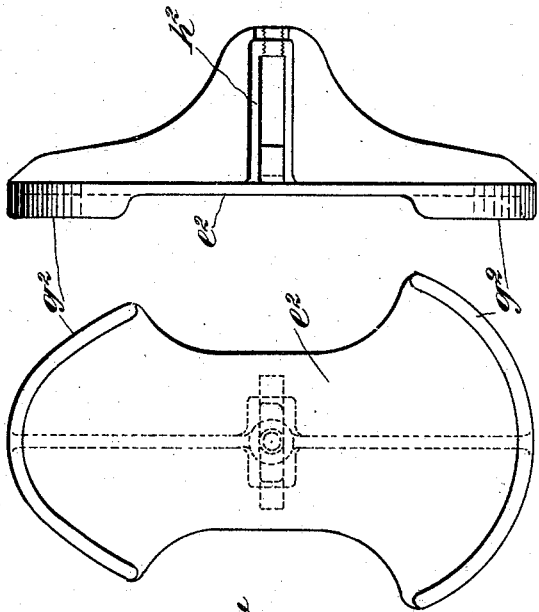
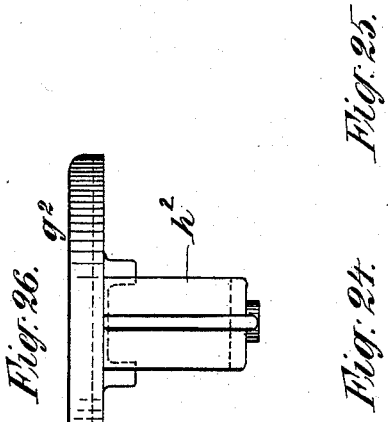
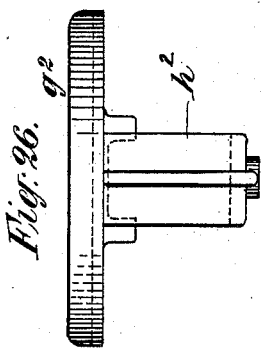
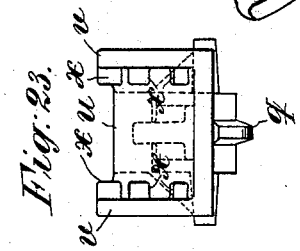
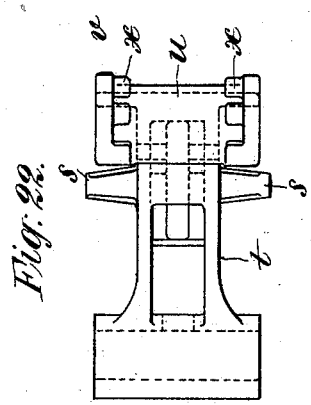
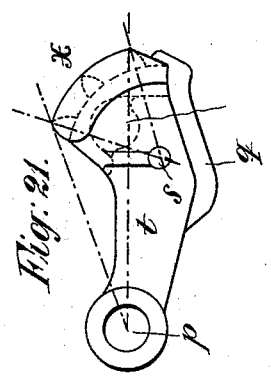
WITNESSES:
INVENTOR:
Philo C. Blaisdell
By A. P. Thayer
Attorney

UNITED STATES PATENT OFFICE.

PHILO C. BLAISDELL, OF BRADFORD, PENNSYLVANIA.

WOOD-BUNDLING MACHINE.

SPECIFICATION forming part of Letters Patent No. 580,816, dated April 13, 1897.

Application filed July 6, 1896. Serial No. 598,123. (No model.)

*To all whom it may concern:*

Be it known that I, PHILO C. BLAISDELL, a citizen of the United States, and a resident of Bradford, in the county of McKean and State of Pennsylvania, have invented certain new and useful Improvements in Wood-Bundling Machines, of which the following is a specification.

My invention consists of various details in construction and combinations of parts of wood-bundling machines in which a pneumatic ram is employed for actuating the compressing-saucer, as hereinafter described, reference being made to the accompanying drawings, in which—

Figure 1 is a side elevation of the complete machine with a charge of wood ready for being compressed and tied and with a number of tied bundles on the tray employed for receiving them preparatory to removal by an assistant. Fig. 2 is an elevation of the upper part of the machine as seen in the direction indicated by the arrow located between Figs. 1 and 2. Fig. 3 is an elevation of the machine with one of the housing-frames removed. Fig. 4 is an inside elevation of the housing-frame detached in Fig. 3. Fig. 5 is an inside elevation of the detached housing-frame, practically same as in Fig. 4, but on a larger scale. Fig. 6 is an outside elevation of said detached housing-frame. Fig. 7 is an elevation of the two housing-frames in a plane at right angles to the views of Figs. 5 and 6, with one of said frames in section. Fig. 8 is a horizontal section of one of the housing-frames on line 2 2, Fig. 5. Fig. 9 is a top view of a housing-frame as represented in Fig. 6. Fig. 10 is a side elevation of the compressing-saucer detached from the follower on which it is carried. Fig. 11 is an elevation of said follower as seen in the direction indicated by the arrow between it and Fig. 10. Fig. 12 is an elevation of the compressing-saucer with a part sectioned off on line 3 3, Fig. 10. Fig. 13 is a top view, Fig. 14 a front elevation, and Fig. 15 a side elevation, of a stop-gage to facilitate piling the wood accurately preparatory to compressing and tying it. Fig. 16 is a sectional elevation, and Fig. 17 a side elevation, of antifriction-rollers employed in actuating the follower by which the compressing-saucer is operated. Fig. 18 is a top view of the follower with the dotted lines indicating the sections of the plates underneath. Fig. 19 is a side elevation of the follower with a part in section on line 19 19, Fig. 20. Fig. 20 is a front elevation of the follower with a part sectioned off on line 20 20, Fig. 19, and with a side and front view of an antifriction-roller used in the guideways for lessening the friction. Fig. 21 is a side elevation, Fig. 22 a front elevation, and Fig. 23 an end elevation, of one of a pair of levers employed in applying the power of the pneumatic ram to the follower in a way to reduce the friction. Fig. 24 is a plan view, Fig. 25 a side elevation, and Fig. 26 an end elevation, of the tray for temporary reception of the bundles.

The body of the machine consists of a pair of upright housing-frames $a$, of cast metal, each having a supporting-standard $b$, formed with a suitable foot-plate $c$, said frames $a$ being formed with studs $d$ on the inner faces, the ends of which are the bearing-points of the respective frames against each other, and said studs are also utilized for connecting the frames together by bolts, as $e$, for which the studs are bored, as indicated in Fig. 7, the holes being preferably counterbored from the outside the greater part of their length. Near the junction of the standards and the frames the standards have a trunnion-bearing aperture $f$, in which a cylinder $g$ of a pneumatic ram is mounted by its trunnions $h$, so as to hang vertically therein, the trunnions being formed on the cylinder at its upper end.

The piston-rod $i$ of the ram extends upward through the bearing-box of the upper cover of the cylinder and carries in its head $k$ a pair of antifriction-rollers $l$ for transmitting the power of the ram.

In the lower cover of the cylinder is an adjusting-screw $m$, by which the limit of the descent of the piston may be varied, and the valve mechanism for controlling the air employed for working the ram is partially represented at $n$, and a treadle is shown at $o$ for actuating the valve, but these and other parts particularly relating to the ram are the subject of another application for Letters Patent filed together with this, and are not therefore more particularly described herein.

On each of the antifriction-rollers $l$, carried in the head $k$ of the ram and which are grooved in the face, a power-transmitting lever $t$ rests intermediately of its ends and in the inclined position shown in Fig. 1, said levers having fulcrum-pivots between the housing-plates at $p$, also having ribs $q$ on the sides resting on the rolls and working in the grooves thereof for guides. The free ends of these levers are segments of a circle having the center $s$ and comprising about fifty degrees, more or less. They are therefore eccentric to the pivots $p$, on which the levers swing, the end of the segment having the greater radius being at the side of the lever bearing on the roller $l$ of the ram-head. These segments are grooved on the face, as shown in Figs. 21, 22, and 23, to provide plain treads $u$ between flanges $v$ for other antifriction-rollers $w$, and said flanges are toothed inside, as shown at $x$, to mesh with corresponding teeth $y$ in the sides of rollers $w$ to prevent the treads $u$ and the rollers from slipping on each other. Upon the antifriction-rollers $w$ a follower $z$ (represented in detail in Figs. 18, 19, and 20) is carried, said follower having a base $a'$, resting on said rollers, and teeth $b'$, meshing with the teeth of said rollers, also to prevent slipping, and from the edges of said base are pendent plates $c'$, reaching downward between the guide-flanges $d'$, formed on the housing-frames to resist the lateral thrusts to which the follower is subject from the action of the levers and rollers and guide the follower properly. The body of the follower has the guide-ribs $e'$ at the extremities of its sides, with which the antifriction-rollers $f'$ are provided in the guiding-grooves $g'$ in the housing-frames to lessen the friction when the follower may be thrust more to one side than the other by unequal lateral thrusts.

The ribs $h'$ of the follower and the ways $i'$ in the housing-frames guide the follower in the transverse direction in which the thrusts are not excessive, and antifriction-rollers are not provided, but may be, if required.

The follower has a boss $j'$ on the top, whereto the compressing-saucer $k'$ is pivoted, the saucer having a recess $l'$, in which the boss is received between the facing-surfaces $m'$ and is secured by a pivot-bolt. The ribs $n'$ at the extremities of the saucer-base work in the guideways $g'$ above the rollers $f'$ for guiding the saucer. The saucer is formed with the usual jaws $o'$, which work between the yokes $p'$, which are secured in the lugs $q'$, formed on the upper extremities of the housing-frames, and cored obliquely, as indicated at $v'$ in Figs. 5 to 8, inclusive, for reception of the extremities of the yokes, which are secured by the nuts $s'$, screwed on said extremities under the lugs against the thrusts of the ram. Set-screws at $u'$ prevent the yokes from dropping when not subject to the thrusts of the ram.

The jaws $o'$ are formed with the slots $t'$ for reception of the wire ties, said slots being flared at the top, as shown, to facilitate placing the ties quickly.

A stop-gage, consisting of the plate $x'$, is employed at the back side of the yokes to close the opening through them and cause the wood $y'$ to be piled accurately with relation to them and the saucer and evenly with reference to the pieces. Said gage-plate is formed with perforated lugs $a^2$, by which it is mounted on stud-pins $b^2$, riveted or otherwise secured in the holes $c^2$ of the upwardly-projecting flanges $e^2$ of the back housing-plate. The said gage-plate is adjustable forward and backward on said stud-pins toward and from the yokes and saucer to set it for wood of different lengths, and is secured in position by set-screws $d^2$.

A tray $e^2$ is used for receiving the bundles $f^2$ temporarily from the hands of the attendant of the machine and preparatory to being removed by the assistant. It is a flat plate of oval outline at its extremities and narrower middle section with vertical flanges $g^2$ at said extremities adapted to receive the bundles of oval shape flatwise and having a socket-lug $h^2$ at the center of the under side adapted to mount the tray adjustably on a horizontal bar $i^2$, said bar being inserted in a socket cored in the housing-plate at $j^2$ and secured by a set-screw $k^2$. A set-screw $h^2$ in the socket-lug secures the tray in position. The narrower middle portion of the tray is designed to facilitate grasping the lower bundle of the pile by the fingers projected under the middle portion when taking the bundles from the tray. The ram-head being forced upward between the levers lying obliquely over the rollers of said head forces them into more upright positions, while at the same time the segments being eccentric to the lever-pivots and taking effect on the rollers resting on them increase the upward movement of the follower with great power with practically no loss by friction except the slight measure due to the lever-pivots and the pivots of the rollers in the ram-head. The segmental heads of the levers might be concentric with the lever-pivots with good results, but the movement of the follower would be somewhat shorter.

It is to be noted that the construction of the machine is such that both of the housing-frames are of like form and are produced from the same pattern and comprise the entirety of the body, standard, supporting-base, and guideways, so that no fitting is required except a little dressing of the guideways and the bearing-studs, boring a few holes, and fitting the pivots of the levers, all making a very simple machine to construct and at the same time being very simple to operate and of durable character.

On the inner surface of the bottom of the saucer I have provided a figure in relief, as $a^4$, Figs. 10 and 12, to impress the bundles with a distinguishing mark for identification of the work of the machine.

I claim—

1. The combination of the ram-head having the antifriction-rollers, levers pivoted at one end in the housing-frames and lying obliquely on said rollers, antifriction-rollers resting on the segmental free ends of said levers, and the follower resting on said rollers carried on the levers substantially as described.

2. The combination of the ram-head having the antifriction-rollers, levers pivoted at one end in the housing-frames and lying obliquely on said rollers, segmental free ends of the levers eccentric to the pivots of the levers, antifriction-rollers carried on said segments, and the follower carried on said last-mentioned rollers substantially as described.

3. The combination of the ram-head having the antifriction-rollers, levers pivoted at one end in the housing-frames and lying obliquely on said rollers, segmental flanged and toothed free ends of the levers, antifriction plain-faced rollers having marginal teeth meshing with the teeth of the flanges, and the follower carried on the said last-mentioned rollers substantially as described.

4. The combination with the housing-frames consisting of two equal upright parts joined together side by side and comprising the entirety of the body, standard and supporting-base and having the integral lower guideways for the pendent follower-plates, and the upper guideways for the antifriction-rollers, of said follower having the sideways working on said rollers, and the pendent flanges between said lower guides, and said antifriction guide-rollers for the follower substantially as described.

5. The combination of the housing-frames consisting of two equal upright parts joined together side by side and comprising the entirety of the body, standard and supporting-base and having the integral guide-grooves for the follower, antifriction-rollers in said grooves and the saucer connected to the upper end of the follower and having the guide-ribs working in said roller guide-grooves substantially as described.

6. The combination of the housing-frames, the ram-cylinder suspended by trunnions of its upper end in bearing-apertures in the standards of the housing-frames, ram-head having the antifriction-rollers, transmitting-levers pivoted at one end in the housing-frames and lying obliquely on said rollers, rollers resting on the segmental free ends of the levers, the follower carried on said last-mentioned rollers, and guides for the sides of the follower subject to lateral thrusts by the ram-head substantially as described.

7. The combination with a wood-bundling machine of the bundle-receiving tray and the supporting-bar therefor projecting laterally from the side of the machine, said tray having the oval flanged ends and the narrower middle portion and also having the socket-lug extending downward from its bottom and being adjustably fitted on the bar substantially as described.

Signed at Bradford, in the county of McKean and State of Pennsylvania, this 6th day of April, A. D. 1896.

PHILO C. BLAISDELL.

Witnesses:
ROBT. L. EDGELT,
JOHN P. MELVIN.